United States Patent
Kalyani et al.

(10) Patent No.: US 9,036,722 B2
(45) Date of Patent: May 19, 2015

(54) ROBUST CHANNEL ESTIMATION AND INTERPOLATION

(75) Inventors: Sheetal Kalyani, Adyar (IN); Raghavendran Lakshminarayanan, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 39 days.

(21) Appl. No.: 13/878,213

(22) PCT Filed: Oct. 7, 2011

(86) PCT No.: PCT/IN2011/000698
§ 371 (c)(1),
(2), (4) Date: Apr. 6, 2013

(87) PCT Pub. No.: WO2012/046252
PCT Pub. Date: Apr. 12, 2012

(65) Prior Publication Data
US 2013/0188757 A1 Jul. 25, 2013

(30) Foreign Application Priority Data
Oct. 7, 2010 (IN) .......................... 2974/CHE/2010

(51) Int. Cl.
*H04K 1/10* (2006.01)
*H04L 25/02* (2006.01)
*H04L 5/00* (2006.01)

(52) U.S. Cl.
CPC ........... *H04L 25/0242* (2013.01); *H04L 5/0007* (2013.01); *H04L 5/0048* (2013.01); *H04L 25/022* (2013.01); *H04L 25/0226* (2013.01); *H04L 25/0232* (2013.01)

(58) Field of Classification Search
CPC .............. H04L 5/0048; H04L 25/0242; H04L 25/0226; H04L 25/022; H04L 5/0007

USPC ......................................................... 375/260
See application file for complete search history.

(56) References Cited

U.S. PATENT DOCUMENTS

| 5,903,610 A * | 5/1999 | Skold et al. ................... 375/285 |
| 6,775,340 B1 * | 8/2004 | Arslan et al. .................. 375/354 |

(Continued)

OTHER PUBLICATIONS

Doukopoulos, "Robust Channel Estimation via FFT Interpolation for Multicarrier Systems," VTC2007-Spring IEEE 65th vehicular Technology Conference, Apr. 22-25, 2007 pp. 1861-1865.*

(Continued)

*Primary Examiner* — Juan A Torres
(74) *Attorney, Agent, or Firm* — Rahman LLC (57) ABSTRACT

Present robust 2 Dimensional Minimum Mean Square Error (2D-MMSE) or minimax approach assumes significant time and frequency selectivity due to which it has a poor Mean Square Error (MSE) performance for Resource Blocks (RBs) with low/moderate frequency and/or time selectivity. A filter cannot be designed assuming low frequency and/or time selectivity and use that for all channel models. The instant invention proposes a Robust Adaptive (RA) MMSE filter that can bridge the gap between a robust 2D-MMSE/minimax and the optimal MMSE approach. The RA-MMSE filter smoothens the filter coefficients of the robust 2D-MMSE filter with the degree of smoothing adaptively changing with amount of frequency and time selectivity within a RB. The method uses multiple hypothesis tests on the maximum likelihood Channel Frequency Response (CFR) estimates at the pilots. The RA-MMSE filter solves the minimax estimation problem with additional constraints on the autocorrelation sequence corresponding to the channel frequency response.

36 Claims, 5 Drawing Sheets

(56) References Cited

U.S. PATENT DOCUMENTS

| | | | |
|---|---|---|---|
| 7,167,578 B2 | 1/2007 | Blake et al. | |
| 7,630,450 B2 | 12/2009 | Duncan | |
| 8,111,763 B2* | 2/2012 | Ma et al. | 375/260 |
| 8,718,164 B2* | 5/2014 | Budianu et al. | 375/260 |
| 2006/0018413 A1 | 1/2006 | Gupta | |
| 2006/0209732 A1* | 9/2006 | Gorokhov et al. | 370/310 |
| 2007/0025460 A1 | 2/2007 | Budianu et al. | |
| 2009/0232230 A1 | 9/2009 | Hung et al. | |
| 2010/0027698 A1 | 2/2010 | Kim et al. | |

OTHER PUBLICATIONS

International Preliminary Report on Patentability Chapter I of WO2012046252 "Robust Channel Estimation and Interpolation", Sep. 4, 2013 (IB/373).*

Eldar, Y. et al., "A Competitive Minimax Approach to Robust Estimation of Random Parameters," IEEE Transactions on Signal Processing, vol. 52, No. 7, Jul. 2004, pp. 1931-1946.

Feng, Y., "Pulse Optimization for a Reconfigurable Baseband Receiver Based on a Single-Tap time-Frequency Wireless Channel Model," Master's Thesis, University of Kassel, Germany, 61 pages, Mar. 2008.

* cited by examiner

ROBUST CHANNEL ESTIMATION AND INTERPOLATION

FIELD OF INVENTION

This invention relates to Orthogonal Frequency Division Multiple Access (OFDMA) based communication networks, and more particularly to channel estimations in OFDMA communication networks.

BACKGROUND OF INVENTION

While there is a vast amount of literature on channel estimation and/or channel frequency response (CFR) estimation in Orthogonal Frequency Division Multiplexing (OFDM) systems, most of the work has focused on systems which have finite but large number of pilots and/or wideband pilots. In both IEEE 802.16m and 3GPP LTE-A, data transmission is in terms of small units called resource blocks (RBs) where a RB comprises of only Q subcarriers per OFDM symbol and R OFDM symbols. Each RB has only P pilots where the numbers of the pilots per RB are kept minimal to reduce the resource overhead during data transmissions. The situation is further aggravated in the cell-edge scenario where the SNR/SINR is very poor leading to very noisy observation on the pilots. Each user need not be allocated more than a RB and hence CFR estimation has to be necessarily carried out using only the pilots within that RB. When one is restricted to using only the pilots within the RB, estimation methods such as the modified least squares (MLS) cannot be applied since it requires wideband pilots. The 2D-minimum mean square error (2D-MMSE) methods can be applied using the pilots in the time frequency grid within the RB. However, optimal 2D MMSE estimation requires knowledge of the channel statistics which are seldom known accurately at the receiver. In the absence of wideband pilots estimating channel statistics such as the channel power delay profile (PDP) would not be possible. At best one could attempt to estimate the CFR autocorrelation functions within the RB, however such an estimate would be poor due to the limited number of pilots (lack of sufficient averaging) and poor SNR (in case of cell-edge conditions).

One approach to not having any knowledge of the channel statistics is to use the robust 2D-MMSE filter in Y. Li, L. Cimini, and N. Sollenberger, "Robust Channel Estimation for OFDM Systems with Rapid Dispersive Fading Channels," IEEE Transactions on Communications, vol 46, pp 902-915, April 1998, which is designed assuming an ideally band limited and time limited uniform scattering function. It was shown that for the case of infinite number of filter taps, this robust 2D-MMSE filter is insensitive to the mismatch between the actual and the assumed scattering functions. However, when the robust 2D-MMSE filter has finite number of taps its insensitivity to the mismatch between the actual channel statistics and the assumed statistics is only approximate. The degradation of the robust 2D-MMSE performance when compared to the optimal MMSE performance becomes especially pronounced when the number of taps of this robust filter is very small as in the case of CFR estimation using only pilots within a RB.

The standard alternative to optimal estimators in the absence of parametric/statistical inputs to the filter is the minimax estimation that minimize the worst case estimation error energy. Depending on the definition of the worst case estimation error, a host of minimax estimators have been derived. The robust MMSE filter Y. Li, L. Cimini, and N. Sollenberger, "Robust Channel Estimation for OFDM Systems with Rapid Dispersive Fading Channels," IEEE Transactions on Communications, vol 46, pp 902-915, April 1998 and the maximally robust MMSE estimator in M. D. Nisar, W. Utschick and T. Hindelang, "Maximally Robust 2-D Channel Estimation for OFDM Systems," IEEE Transactions on Signal Processing, vol. 58, pp. 3163-3172, June 2010 are both minimax estimators. The minimax estimators are in general conservative i.e., their MSE performance for any channel model is upper bounded by the worst case MSE performance. However this gives no indication of the gap between the MSE achieved by the minimax estimator and the optimal estimator. Moreover, for cases when the minimax MSE differs considerably from the optimal MSE, it is possible that adaptive methods that can deduce the structure of the CFR/channel and use that in conjunction with the minimax estimator can have a lower MSE than the minimax estimator itself.

While there has been work going on in developing minimax filters for channel estimation, the fact that the actual channel model seen may be very different from the worst case channel model has not been exploited. Practical channel models such as Pedestrian A, Vehicular A and Pedestrian B which are channel models recommended in evaluation methodology of many standards are not as frequency selective as the uniform scattering function assumed in the design of the robust MMSE filter or the autocorrelation sequence used in the design of the minimax filter (Henceforth when we use the term minimax estimator/filter/interpolator, we refer to the maximally robust MMSE estimator/filter/interpolator in M. D. Nisar, W. Utschick and T. Hindelang, "Maximally Robust 2-D Channel Estimation for OFDM Systems," IEEE Transactions on Signal Processing, vol. 58, pp. 3163-3172, June 2010).

Hence, the gap between the minimax filter and the optimal filter (or the gap between the robust MMSE filter and optimal filter) can be significant in practical scenarios. Therefore, we propose to adaptively smoothen the coefficients of the robust MMSE filter in Y. Li, L. Cimini, and N. Sollenberger, "Robust Channel Estimation for OFDM Systems with Rapid Dispersive Fading Channels," IEEE Transactions on Communications, vol 46, pp 902-915, April 1998 depending on the actual time and frequency selectivity seen in the RB and the operating SNR. We also propose to take into account the time and frequency selectivity of the CFR in the RB, and use this to formulate additional constraints in the optimization problem being solved to obtain the minimax estimator (the maximally robust MMSE estimator in M. D. Nisar, W. Utschick and T. Hindelang, "Maximally Robust 2-D Channel Estimation for OFDM Systems," IEEE Transactions on Signal Processing, vol. 58, pp. 3163-3172, June 2010). Such an approach is able to adaptively change the minimax estimator according to the underlying CFR selectivity Consider a broadband wireless communication system with $N_t$ transmit and $N_r$ receive antennas based on emerging OFDMA-based IEEE 802.16m and 3GPP LTE-A standards. Data is allocated in groups of resource blocks (RBs) with each RB composed of Q subcarriers and R OFDM symbols. It is called a localized RB when the Q subcarriers are contiguous, and is known as a distributed RB when the Q subcarriers span the entire frequency band. Further, in the localized mode, multiple RBs can themselves be either contiguous or distributed over the entire band. Q and R are 18 and 6, respectively for IEEE 802.16m, and 12 and 7, respectively for LTE standards. Each RB comprises of pilot subcarriers interspersed with data sub-carriers. Channel estimation for a RB is done using only the pilots in that RB. The received OFDMA symbol after FFT at the receiver can be represented by $$Y_{k,n} = X_{k,n} H_{k,n} + V_{k,n} \quad (1)$$

where $Y_{k,n}$ is the received data corresponding to the $k^{th}$ subcarrier in the $n^{th}$ OFDM symbol, $H_{k,n}$ is the corresponding CFR and $V_{k,n}$ is complex additive Gaussian noise. In the vector notation, the OFDMA system representation on the pilots within an RB is given by $$Y_p = X_p H_p + V_p V_p \sim CN(0, C_v) \quad (2)$$

where, $\{Y_p, H_p, V_p \in \mathbb{C}^{P \times 1}\}$, $X_p = \text{diag}(X_{k,n}) \in \mathbb{C}^{P \times P}$ is a diagonal matrix whose diagonal values are the entries that contain the pilot symbols and $H_p$, is the vector of the CFR seen at the pilot locations. Here $C_v$ is the covariance matrix of noise. The subscript p stands for the pilots and P for the number of pilots. For example, the observations on the pilot locations are identified as $Y_p = [Y_{1,1} Y_{2,1} Y_{17,2} Y_{18,2} Y_{9,3} Y_{10,3} Y_{1,4} Y_{2,4} Y_{17,5} Y_{18,5} Y_{9,6} Y_{10,6}]^T$ with the first subscript denoting the subcarrier index and the second subscript denoting OFDM symbol number.

The objective is to obtain an accurate estimate of the CFR over the time-frequency grid given the measurements at the specific pilot locations. The ML estimate of the CFR at the pilot locations is given by the P×1 vector $$\hat{H}_{ML,p} = (X_p^H C_v^{-1} X_p)^{-1} X_p^H C_v^{-1} Y_p \quad (3)$$

and it is equivalent to the zero forcing estimates of the CFR at the pilot locations in the case of white Gaussian noise. The optimal MMSE estimator of the CFR over the entire RB is the 2D-Wiener smoother that utilizes the correlations along time and frequency. Vectorized MMSE estimate of the CFR matrix over the RB, namely, $\hat{H}_{MMSE} \in \mathbb{C}^{QR \times 1}$ can be obtained by applying the Wiener smoother $W_{opt} \in \mathbb{C}^{QR \times P}$ onto the received pilot data thus, $$\hat{H}_{MMSE} = W_{opt} Y_p \quad (4)$$

where $W_{opt} = R_{H,Y_p} R_{Y_p,Y_p}^{-1}$ and $R_{H,Y_p} = E[H Y_p^H] \in \mathbb{C}^{QR \times P}$ and $R_{Y_p,Y_p} = E[Y_p Y_p^H] = X_p R_{H_p,H_p} X_p^H + C_v \in \mathbb{C}^{P \times P}$ are the cross-correlation (between actual CFR over the RB and received data at pilots) and auto-correlation (of received data at pilots) matrices respectively. For the optimal filter $W_{opt}$, the theoretical MSE is $$MSE_{\hat{H}_{MMSE}} = tr(R_{H,H} - W_{opt} R_{Y_p,H}) \quad (5)$$

where $tr(X)$ is the trace of the matrix X and $R_{H,H} = E[HH^H]$ where $H \in \mathbb{C}^{QR \times 1}$ is the vectorized version of the actual CFR over the RB.

When knowledge of the correlation functions required for the optimal MMSE filter is not available one alternative is the robust 2D-MMSE approach [Y. Li, L. Cimini, and N. Sollenberger, "Robust Channel Estimation for OFDM Systems with Rapid Dispersive Fading Channels," IEEE Transactions on Communications, vol 46, pp 902-915, April 1998] which assumes a uniform scattering function for designing the Wiener smoother namely, $W_{rob}$. Vectorized robust 2D-MMSE estimate of the CFR matrix, namely, $\hat{H}_{rob} \in \mathbb{C}^{QR \times 1}$ is given by $$\hat{H}_{rob} = W_{rob} Y_p \quad (6)$$

with its MSE given by $$MSE_{\hat{H}_{rob}} = tr(R_{H,H} - W_{rob} R_{Y_p,H} - R_{H,Y_p} W_{rob} + W_{rob} R_{Y_p,Y_p} W_{rob}^H) \quad (7)$$

The interpolation/filtering performed by the robust 2D-MMSE method assumes an uniform power delay profile and uniform Doppler profile and hence the spaced frequency spaced time correlation function is given as $$r_{rob}(\Delta f, \Delta t) = \text{sinc}(\pi T_m \Delta f) e^{-j 2 \pi \tau_{sh} \Delta f} \text{sinc}(\pi f_D \Delta t) \quad (8)$$

where $T_m$ is the assumed multipath delay spread and $f_D$ is assumed maximum Doppler frequency. The sinc function is defined as $\text{sinc}(x) = \sin(x)/x$. It has suggested that $\tau_{sh}$ be set to zero so that the spaced frequency correlation function sinc $(\pi T_m \Delta f) e^{-j 2 \pi \tau_{sh} \Delta f}$ becomes real valued so that the complexity of the filtering is halved. This complexity reduction is achieved by setting $T_m$ to be twice as high as the assumed multipath delay spread assumed for $\tau_{sh} \neq 0$ case. In other words, the spaced frequency spaced time correlation function for the case of real filter coefficients is given by $$r_{rob}(\Delta f, \Delta t) = \text{sinc}(\pi 2 T_m \Delta f) \text{sinc}(\pi f_D \Delta t) \quad (9)$$

It is apparent that the robust 2D-MMSE approach assumes significant time and frequency selectivity even if the actual channel has very less frequency and/or time selectivity. Therefore it shows a poor MSE performance in the case of RBs with low or moderate frequency and/or time selectivity when compared to the optimal MMSE approach. At the same time one cannot design a filter assuming low frequency and/or time selectivity and use that for all channel models since such an approach would show significant degradation when the actual channel is more frequency and/or time selective.

SUMMARY

The principal object of this invention is to develop new estimators that can bridge the gap between the robust 2D-MMSE/minimax estimator and the optimal MMSE approach.

Disclosed herein is a method for channel estimation for a received signal in an OFDM network, the method comprising of calculating a first channel frequency response estimate using the signal at pilot locations in the signal; grouping the first channel frequency estimates into a plurality of disjoint clusters; formulating at least one hypothesis test to check for similarity between the clusters; and estimating a final channel frequency response estimate, depending on level of similarity between the clusters.

Also, disclosed herein is an OFDM network, the network comprising of at least one means configured for calculating a first channel frequency response estimate using a received signal at pilot locations in the signal; grouping the first channel frequency estimates into a plurality of disjoint clusters; formulating at least one hypothesis test to check for similarity between the clusters; and estimating a final channel frequency response estimate, depending on level of similarity between the clusters.

Disclosed herein is a device in an OFDM network, the device comprising of at least one means configured for calculating a first channel frequency response estimate using a received signal at pilot locations in the signal; grouping the first channel frequency estimates into a plurality of disjoint clusters; formulating at least one hypothesis test to check for similarity between the clusters; and estimating a final channel frequency response estimate, depending on level of similarity between the clusters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a robust channel estimation and interpolation in OFDMA systems. Referring now to the drawings, and more particularly to FIGS. 1 through 5, where similar reference characters denote corresponding features consistently throughout the figures, there are shown preferred embodiments.

The embodiments herein achieve a robust adaptive MMSE (RA-MMSE) filter, which smoothens the filter coefficients of the robust 2D-MMSE filter.

The RA-MMSE filter can also be formulated as a minimax CFR estimation problem with additional constraints on the autocorrelation sequence used to define the MMSE filter.

Figure 1:
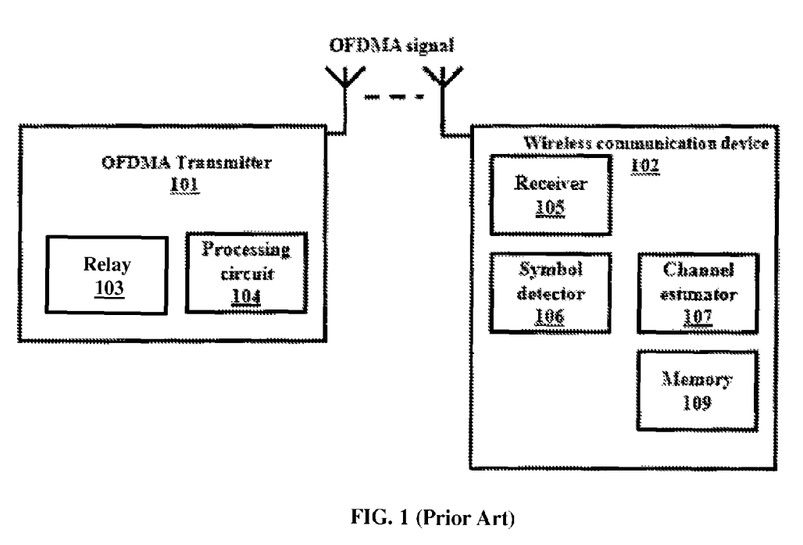
FIG. 1 is a block diagram illustrating a transmitter 101 and a wireless communication device 102 in an OFDM network, according to embodiments as disclosed herein.

FIG. 1 is a block diagram illustrating a transmitter and a wireless communication device in an OFDM network, according to embodiments as disclosed herein. FIG. 1 illustrates one embodiment of a transmitter 101 that is configured to transmit an Orthogonal Frequency Division Multiplex (OFDM) signal to one or more receiving devices 102, although only one wireless communication device 102 is illustrated for simplicity. The transmitter 101 transmits one or more RBs where an RB comprises of Q contiguous subcarriers and R consecutive OFDM symbols. Each RB has P pilots interspersed with data and control signals. In an embodiment, the transmitter 101 can comprise of a radio base station in a wireless communication network. In at least one such embodiment, the transmitter 101 comprises a base station configured according to the Long Term Evolution (LTE) extensions of the Wideband Code Division Multiple Access (WCDMA) standards promulgated by the Third Generation Partnership Project (3GPP). Further, the wireless communication device 102 may comprise at least one of compatible cellular radiotelephone, PDA, pager, radio modem card, or other mobile station or communications device 102.

Further, the transmitter 101 may include one or more processing circuit 104s and operatively associated transmit circuit such as a relay 103.

The wireless communication device 102 may comprise of receiver 105 circuit and channel estimation circuit 107. The wireless communication device may also comprise of a Memory unit 109 for storing detected data and control signals, a symbol detector unit 106 which equalizes the received data using the channel estimated by the channel estimator 107. Those skilled in the art will appreciate that the receiver 105 may include other functional elements associated with received signal processing, and that the illustrated circuits may be implemented in hardware, software, or any combination thereof. For example, the receiver 105 circuit may include analog front-end circuits, such as filtering, amplification/gain-control, and analog-to-digital conversion circuits, which are configured to provide digital sample streams corresponding to the antenna-received OFDM signal(s).

Further, the channel estimation circuit 107 may comprise part of a baseband processing circuit 104, which comprises one or more general- or special-purpose microprocessors configured via program instructions to carry out a number of digital signal processing functions, including channel estimation. The channel estimation circuit 107 is, in one or more embodiments, configured to carry out the processing of received RB in order to find the channel frequency response corresponding to the received RB so that this estimated CFR can be used for equalizing the received control and data signal within the RB.

Figure 2:
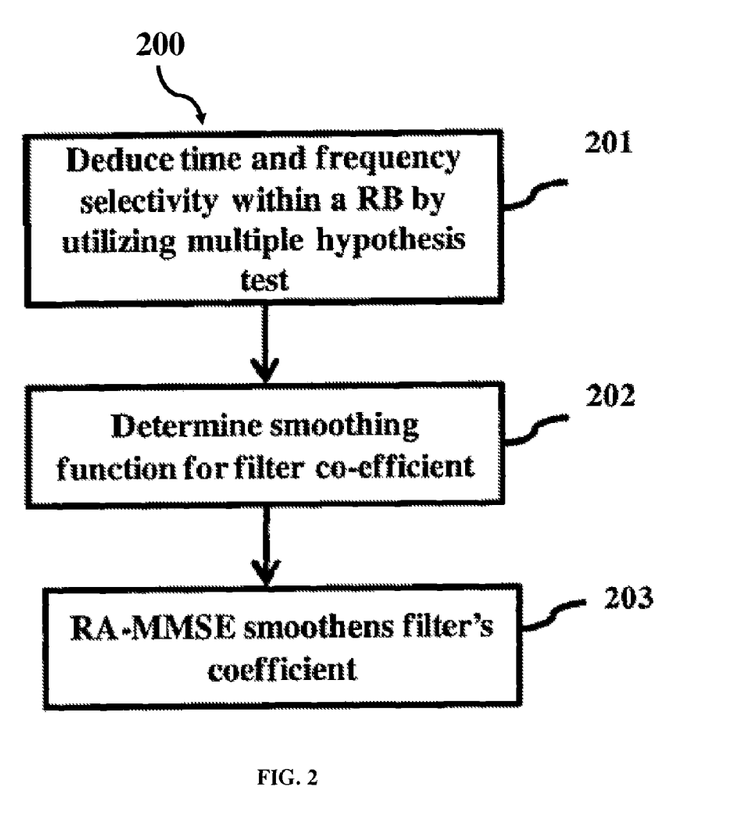
FIG. 2 is a flow chart which depicts process to smoothen the filter coefficients of a robust 2D-MMSE filter, according to embodiments as disclosed herein.

FIG. 2 is a flow chart which depicts process to smoothen the filter coefficients of a robust 2D-MMSE filter, according to embodiments as disclosed herein. The extent of time and frequency selectivity within an RB can be deduced (201) by utilizing multiple hypothesis tests on the maximum likelihood (ML) CFR estimates at the pilots. Depending on the outcome of the hypothesis tests, the RA-MMSE method can decide (202) the smoothing function to be applied on the filter coefficients of the robust 2D-filter. The Robust Adaptive MMSE (RA-MMSE) or interpolation filter can smoothen (203) the filter coefficients of the robust 2D-MMSE filter with the degree of smoothing adaptively changing with amount of frequency and time selectivity within a RB. The various actions in the method 200 can be performed in the order presented, in a different order or simultaneously. Further, in some embodiments, some actions listed in FIG. 2 can be omitted.

The interpolation filter can be designed so as to be aware of the frequency and/or time selectivity of the CFR within the RB. Further, the filter can change its coefficients adaptively with a change in the frequency and/or time selectivity of the CFR. Further, the adaptive change in the filter does not require the knowledge of the channel PDP and Doppler profile, as obtaining these statistics is non-trivial.

Figure 3:
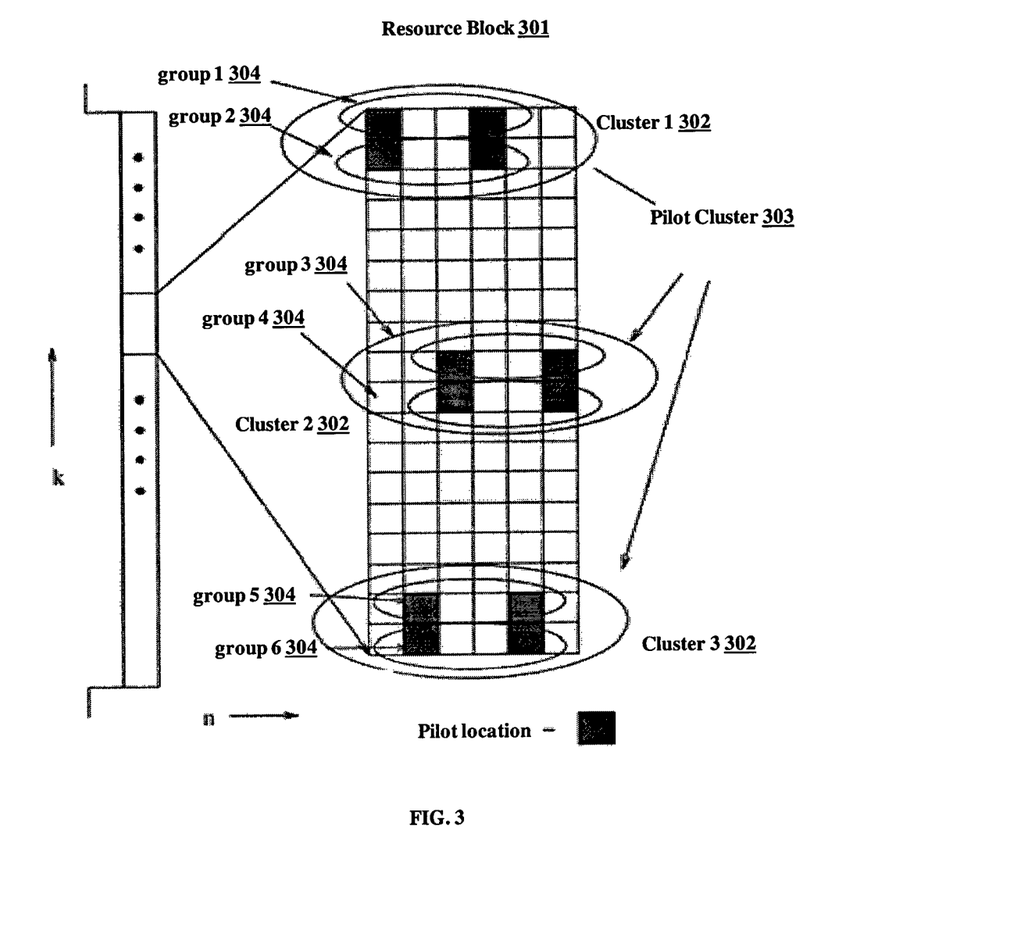
FIG. 3 is a diagram illustrating an OFDM block structure, according to embodiments as disclosed herein.

FIG. 3 is a diagram illustrating an OFDM block structure, according to embodiments as disclosed herein. Embodiments disclosed herein enable to obtain a measure of the frequency and/or time selectivity of the channel over the region of interest such as a Resource Block (RB) 301 by measuring the statistical variation of the ML CFR estimates at the pilot locations. Here n denotes the OFDM symbol index while k denotes the subcarrier index. Each RB 301 comprises of pilot subcarriers interspersed with data sub carriers. Each OFDM symbol in the RB has two pilots which are on adjacent subcarriers. Further, the pilot positions are the same in first and fourth OFDM symbol, second and fifth OFDM symbol and third and sixth OFDM symbols. Based on the pilot locations and the dimensions of the RB 301, the pilots can be grouped 304. Further, different groups 304 can constitute disjoint clusters $\{Z_i\}$ 302, where each cluster 302 may comprise of $p_i$ pilots for $1 \le i \le r$. Tests for the pairwise equality of the means of the different clusters 302 can be used to deduce about the CFR selectivity. Multiple hypothesis tests can be formulated to analyze the similarity between the ML CFR estimates at different locations. The details of the hypothesis tests and the way its outcome is used for designing the RA-MMSE filters are mentioned.

Figure 4:
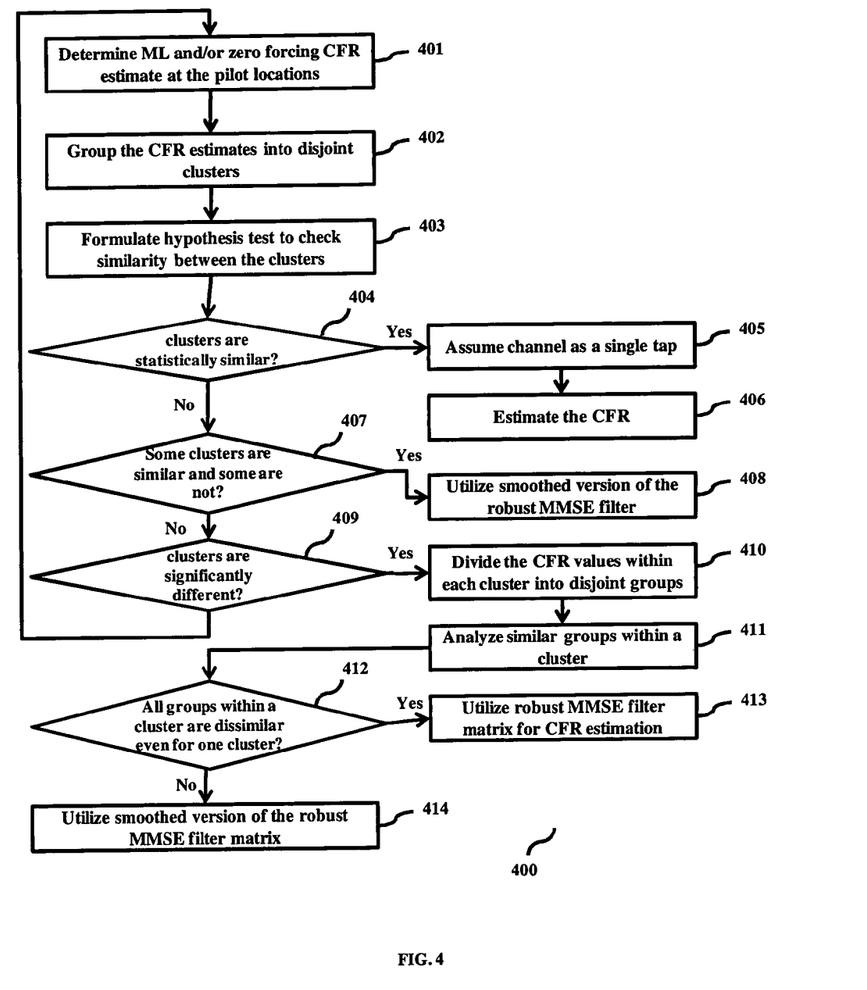
FIG. 4 is a flow chart which depicts process for hypothesis test to determine frequency/time selectivity over the RB based on the amplitude of difference between pair wise means, according to embodiments as disclosed herein.

FIG. 4 is a flow chart which depicts process for hypothesis test to determine frequency/time selectivity over the RB based on the amplitude of difference between pair wise means, according to embodiments as disclosed herein. The ML and/or zero forcing channel frequency response (CFR) estimate at the pilot locations can be determined (401). Further, the ML CFR estimates on the pilots can be grouped (402) into disjoint clusters as depicted in the FIG. 3. Hypothesis test can be formulated (403) to check the similarities between the clusters. The hypothesis test can check (404) if all the clusters are similar. If the hypothesis test indicates that all the clusters are similar, then it can be assumed (405) that the channel is a single tap. Further, assuming single tap channel, the CFR can be estimated (406). However, if the hypothesis test indicates that not all the clusters are similar, then the hypothesis tests can check (407) if some of the clusters are similar while some are not. If the hypothesis test indicates that some of the clusters are similar while some or not, then a smoothed version of the robust MMSE filter matrix can be utilized (408) wherein the smoothing is a function of the extent to which the clusters are similar. However, if the hypothesis tests indicate that all the clusters differ significantly (409) then the CFR values within each cluster can be divided (410) into disjoint groups. Further, the groups within a cluster can be analyzed using hypothesis tests (411) to identify similar groups. If all the groups within a cluster are dissimilar (412) even for one cluster then the robust MMSE filter matrix itself can be utilized (413) for CFR estimation. However, if check performed for all the groups within a cluster indicates that all groups within a cluster are similar and this is true for each cluster, then again utilize (414) a smoothed version of robust MMSE filter matrix where the smoothing now reflects the fact that the clusters are not similar but within a cluster the groups are similar. The various actions in the method 400 can be performed in the order presented, in a different order or simultaneously. Further, in some embodiments, some actions listed in FIG. 4 can be omitted.

In negligible time selectivity (pedestrian speeds), the ML CFR estimates on the pilots can be grouped into three disjoint clusters as depicted in the FIG. 3. The corresponding cluster means can be determined as $m_1$, $m_2$ and $m_3$ respectively. The RB has negligible frequency selectivity if $m_1$, $m_2$ and $m_3$ are statistically similar. However, the RB can have significant frequency selectivity, if $m_1$, $m_2$ and $m_3$ differ "significantly" from each other in that RB. If only a subset of the means is statistically equal then it may imply that the CFR is neither flat nor significantly selective within the RB. The under mentioned multiple hypothesis tests can be used to ascertain the extent of frequency selectivity in an RB in the case when there is negligible selectivity along time. Similar tests can be constructed for the case when there is negligible selectivity along frequency but non-negligible selectivity along time by clustering the ML estimates appropriately. Further, an individual can simultaneously or independently test for both time and frequency selectivity.

Testing for frequency selectivity within a RB constitutes a multiple test of hypothesis which can check for pair-wise equality of the mean value of the ML CFR estimate of each cluster with every other cluster. To test for pair-wise equality of all the means, the test of hypothesis can be performed on $$\binom{r}{2}$$

combination of the clusters where r is the number of clusters. Since the pilots have been clustered into three disjoint groups in this case, therefore $$\binom{3}{2} = 3$$

hypothesis test are performed. The CFR estimates in the $i^{th}$ cluster $$\{\hat{H}_{ML,p}\}_i \sim \mathcal{N}(m_i, C_i)$$

are i.i.d. samples. Let $m_i = [\text{real}(m_i) \text{imag}(m_i)]^T$ (Here real(x) denotes real part of x and imag(x) is the imaginary part of x) to test the following null hypothesis:

$$H_0: m_i = m_j \text{ versus } H_i: m_i \ne m_j \forall i,j \text{ and } i \ne j \quad (10)$$

When all the clusters have equal number of samples, i.e., P/r and covariance of CFR estimates in each cluster is known and is equal to $$C_i = \sigma^2 I_{\frac{P}{r}},$$

then $$R_i = \frac{\sigma^2}{2} I_2 \forall i$$

where $R_i$ is the covariance matrix of the real and imaginary parts of CFR estimates in the $i^{th}$ cluster. Further, $I_X$ is the identity matrix with dimension X. Then, the statistic U for testing equality of the mean of the $i^{th}$ cluster with respect to the mean of the $j^{th}$ cluster can be given by:

$$U = \frac{P}{r}(m_i - m_j)^T (R_i + R_j)^{-1}(m_i - m_j) \quad (11)$$

Since $$R_i = \frac{\sigma^2}{2} I \forall i.,$$

the test statistic can be given by $$U = \frac{P}{r\sigma^2}(m_i - m_j)^T(m_i - m_j) \qquad (12)$$

and it follows the chi-square distribution with two degrees of freedom under the null hypothesis in (10). The level of significance of each test is set to a where a is a function of the combined effect of type I and type II errors of the three hypothesis tests. When the noise covariance is also not known and has to be estimated instead of the chi-square statistic given above, one can use the corresponding Student's-t statistic or the Hotelling's $T^2$ statistic or other multivariate generalizations of the Student's t statistic.

In another embodiment one could use tests used for multiple comparisons such as Tukey-Kramer method, Holm's sequentially rejective Bonferroni method and like.

If every pair of means satisfy the null hypothesis in (10), all the means are statistically similar implying that either the channel is flat or the noise is high enough to mask the frequency selectivity of the channel. The interpolator filter can give equal weight to all the observations. Hence, when the null hypothesis is satisfied by all 3 tests the proposed MMSE filter can be given by:

$$W_{prop} = W_{rob} 1_P 1_P^T / P \qquad (13)$$

where $1_P$ is a P×1 vector with all entries equal to one. Alternatively, when the null hypothesis is satisfied for every pair of clusters or at least r−1 pairs then one can assume that the channel behaves like a single tap channel in the corresponding RB and estimate the CFR assuming single tap channel.

Whereas, if the test does not satisfy the null hypothesis in (10), for even one pair of means then this implies that there is significant frequency selectivity within the RB and hence, the interpolation filter can be designed for a frequency selective channel. The probability that all the tests do not satisfy the null hypothesis even though the null hypothesis were correct is given by $\alpha^r$, which in the case of $\alpha=0.005$ and r=3 is very small. This in turn may imply that the probability of assuming that the CFR has significant frequency selectivity when it is actually flat is nearly zero. The pilot pattern in FIG. 3 is such that, in each OFDM symbol in the RB, there are two pilots on adjacent subcarriers and the pilot positions are the same in first and fourth OFDM symbol, second and fifth OFDM symbol and third and sixth OFDM symbols. Therefore, when the null hypothesis in (10) is not satisfied for any pair of means, to further check the extent of frequency selectivity, one could form six smaller clusters denoted by groups one to six as shown in FIG. 3. As the Clusters 1 to 3 are not similar, a check can be made if Group 1 is similar to Group 2, Group 3 is similar to Group 4 and Group 5 is similar to Group 6 (i.e. whether selectivity between adjacent subcarriers in frequency is negligible though the overall selectivity within the RB is non-negligible). The mean of $i^{th}$ Group (where a group comprises of two ML CFR estimates on pilots) can be denoted by $g_i$ and $g_i = [\text{real}(g_i) \text{imag}(g_i)]^T$. To test similarity of group means, the null hypothesis used can be $$H_{00}: g_i = g_{i+1}, i \in \{1,3,5\} \qquad (14)$$

When the ML CFR estimates in all groups have i.i.d noise covariance the test statistic can be given by $$U = \frac{P}{2r\sigma^2}(g_i - g_{i+1})^T(g_i - g_{i+1}) \qquad (15)$$

and it follows the chi square distribution with two degrees of freedom under the null hypothesis $H_{00}$. The level of significance is set to $\alpha_g$ for each of the hypothesis test and it is a function of the type I and type II errors of the hypothesis tests. If the null hypothesis is not satisfied for even one of the three hypothesis tests in (14), it indicates that the frequency selectivity is so high that even the CFR on adjacent subcarriers vary. Therefore in such a case, the robust 2D-MMSE interpolator itself can be used, since it is designed for such highly frequency selective channel. Hence, for this case $$W_{prop} = W_{rob} \qquad (16)$$

However, if the null hypothesis in (14) is satisfied for all the 3 tests then at least the selectivity between adjacent subcarriers is negligible and in such a case using the robust 2D-MMSE interpolator would be detrimental as it assumes that even adjacent subcarriers see varying CFR values. Therefore, for such a case the received data on pilot locations which are on same or adjacent subcarriers in frequency can be given the same weight while interpolating them using RA-MMSE method. For example, $W_{prop}$ should give equal weight to and $Y_{1,1}, Y_{2,1}, Y_{1,4}$, and $Y_{2,4}$ while using them for interpolation. Therefore, the interpolator in this case can be:

$$W_{prop} = \frac{r}{P}\sum_{i=1}^{3} W_{rob} S_{S_i} S_{S_i}^T \qquad (17)$$

where $S_{S_i}$ is a P×1 vector where at locations defined by the set $S_i$ the entries are ones and at remaining locations the entries of the vector are zeros. Here $S_1 = \{1,2,7,8\}$, $S_2 = \{3,4,9,10\}$ and $S_3 = \{5,6,11,12\}$. For example, $S_{S_1}$ is a column vector of dimension P×1 with the $1^{st}, 2^{nd}, 7^{th}$ and $8^{th}$ entries being one and all other entries being zero, i.e., $S_{S_1} = [1\ 1\ 0\ 0\ 0\ 0\ 1\ 1\ 0\ 0\ 0\ 0]^T$. Hence, the $j^{th}$ entry of $W_{rob} S_{S_1}$ is the sum of the $1^{st}, 2^{nd}, 7^{th}$ and $8^{th}$ elements of the $j^{th}$ row of $W_{rob}$. An entry of the $j^{th}$ row of $W_{rob} S_{S_1} S_{S_1}^T$ is either zero or the $j^{th}$ value of $W_{rob} S_{S_1}$.

If the null hypothesis in (10) is satisfied for only one pair of means then the channel is neither completely flat and nor is it highly selective. In an embodiment, the interpolator defined in (17) can be used by interpolation filter to reflect the fact that the CFR is neither completely flat and nor is it highly selective as it assumes that at least the channel on adjacent subcarriers in frequency are similar and that selectivity is not so significant that it affects even adjacent subcarriers.

In another embodiment, the interpolation filter can reflect that the channel is neither completely flat and nor is it highly selective by determining for which pair of means the null hypothesis are satisfied and for which pairs it is not. For the case of three clusters in FIG. 3, the strategy can give rise to three more possible interpolators, namely, $$W_{prop} = \begin{cases} \frac{r}{2P}W_{rob}S_{S_4}S_{S_4}^T + \frac{r}{P}W_{rob}S_{S_2}S_{S_2}^T & \text{if} \\ H_0: m_i = m_j \text{ true for only } m_1 \text{ and } m_2 \\ \frac{r}{2P}W_{rob}S_{S_5}S_{S_5}^T + \frac{r}{P}W_{rob}S_{S_3}S_{S_3}^T & \text{if} \\ H_0: m_i = m_j \text{ true for only } m_1 \text{ and } m_3 \\ \frac{r}{2P}W_{rob}S_{S_6}S_{S_6}^T + \frac{r}{P}W_{rob}S_{S_1}S_{S_1}^T & \text{if} \\ H_0: m_i = m_j \text{ true for only } m_2 \text{ and } m_3 \end{cases} \quad (18)$$

where $S_{S_1}$ is a P×1 vector where at locations defined by the set $S_i$ the entries are ones and at remaining locations the entries of the vector are zeros. Here $S_1=\{1,2,7,8\}$, $S_2=\{3,4,9,10\}$, $S_3=\{5,6,11,12\}$, $S_4=\{1,2,5,6,7,8,11,12\}$, $S_5=\{1,2,3,4,7,8,9,10\}$ and $S_6=\{3,4,5,6,9,10,11,12\}$ The aforementioned hypothesis tests are based on the magnitude of the pairwise difference between the means of the different clusters of the ML channel estimates. An alternative is to setup hypothesis tests based on the angle between every pair of cluster/group means.

The probability density function (pdf) of the angle between two vector perturbed by Gaussian noise can be used to setup the hypothesis tests. If in the noiseless case, the angle between the two vectors of the same power (energy) is zero, then in the presence of independent Gaussian perturbations on the vectors, the cumulative distribution function (cdf) of the angle between them is $$F(\psi) = 1 - \frac{\sin(\psi)}{4\pi}\int_{-\frac{\pi}{2}}^{\frac{\pi}{2}} \frac{e^{-S(1-\cos(\psi)\cos(t))}}{1-\cos(\psi)\cos(t)}dt \quad (19)$$

where S is the ratio of signal power of the vector to noise power of the noise perturbing the vector. The test of hypothesis constitutes $$H_0: \angle(m_i, m_j) = 0 \; \forall i,j \text{ such that } i \neq j \quad (20)$$

Using the cdf (19) and level of significance β, i.e., the threshold angle value beyond which null hypothesis is rejected is given by $\psi_{th} = F^{-1}(1-\beta)$ where $F^{-1}(x)$ gives the angle value $\psi$ such that. $F(\psi)=x$ Here $\angle(m_i,m_j)$ denotes the angle between $m_i$ and $m_j$. Specific to the clusters shown in FIG. 3, $$S = \frac{4\left|\frac{1}{P}\sum_{i=1}^{P}\hat{H}_{ML,p,i}\right|^2}{\sigma^2}.$$

If all three hypothesis test satisfy the null hypothesis in (20) then the interpolator can be given by (13) or a single tap channel can be assumed while estimating the CFR. If the null hypothesis is true for only one pair of means then the possible interpolators can be given by $$W_{prop} = \begin{cases} \frac{r}{2P}W_{rob}S_{S_4}S_{S_4}^T + \frac{r}{P}W_{rob}S_{S_2}S_{S_2}^T & \text{if} \\ H_0: \angle(m_i, m_j) = 0 \text{ true for only } m_1 \text{ and } m_2 \\ \frac{r}{2P}W_{rob}S_{S_5}S_{S_5}^T + \frac{r}{P}W_{rob}S_{S_3}S_{S_3}^T & \text{if} \\ H_0: \angle(m_i, m_j) = 0 \text{ true for only } m_1 \text{ and } m_3 \\ \frac{r}{2P}W_{rob}S_{S_6}S_{S_6}^T + \frac{r}{P}W_{rob}S_{S_1}S_{S_1}^T & \text{if} \\ H_0: \angle(m_i, m_j) = 0 \text{ true for only } m_2 \text{ and } m_3 \end{cases} \quad (21)$$

If the null hypothesis is not satisfied for even one single pair of cluster means then one follows the approach detailed in the previous subsection, with the pilots being clustered into Groups as shown in FIG. 3. The hypothesis test used for testing similarity of group means is $$H_{00}: \angle(g_i, g_{i+1}) = 0 \; i \in \{1,3,5\} \quad (22)$$

which can be tested using the cdf given in (19) with level of significance of the test set to β and specific to the groups shown in FIG. 3, $$S = \frac{2\left|\frac{1}{P}\sum_{i=1}^{P}\hat{H}_{ML,p,i}\right|^2}{\sigma^2}.$$

Figure 5:
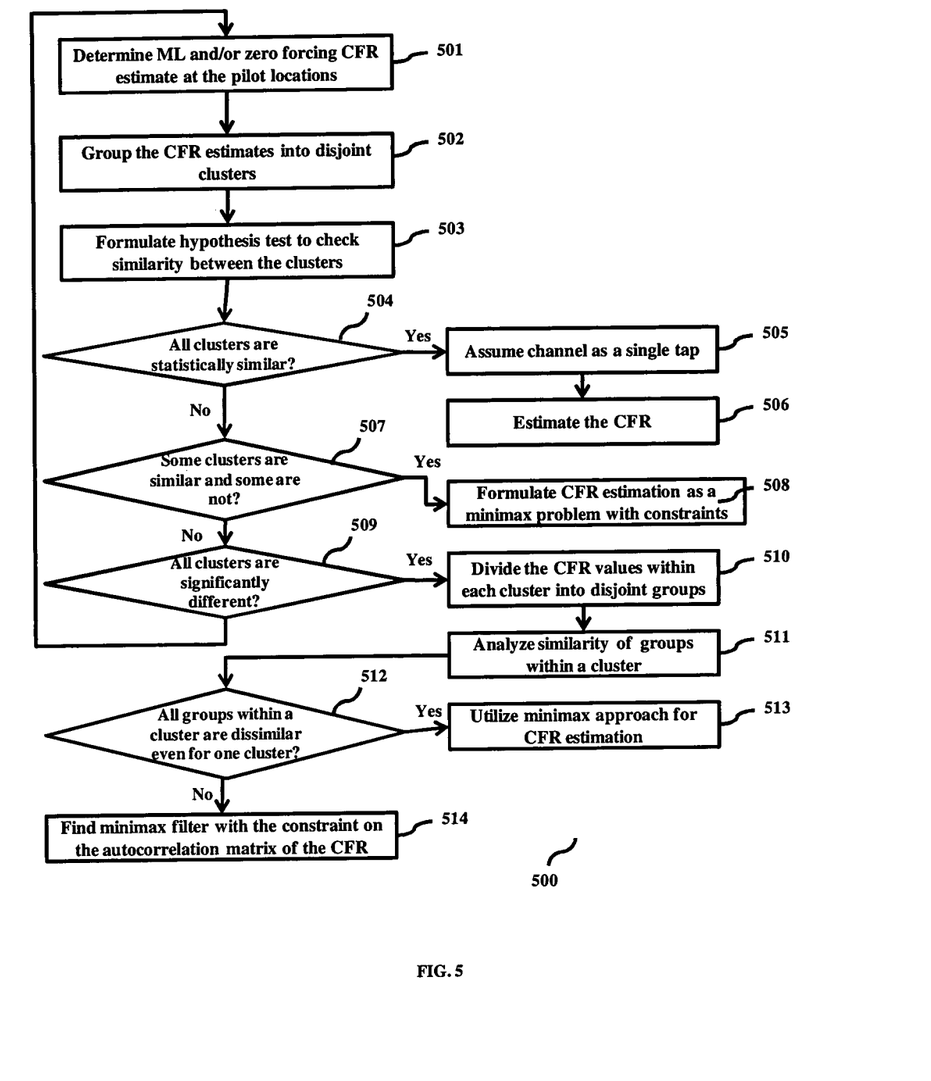
FIG. 5 is a flow chart which depicts process for hypothesis test to determine frequency/time selectivity over the RB based on the angle between the means of different clusters, according to embodiments as disclosed herein.

If the null hypothesis in (22) fails for even one pair of group means then $W_{prop}$ is given by (16) otherwise it is. given by (17) as explained in the previous subsection FIG. 5 is a flow chart which depicts a process for a hypothesis test to determine frequency/time selectivity over the RB based on either the angle between the means of different clusters or on the amplitude of the difference between two cluster means, according to embodiments as disclosed herein. The ML and/or zero-forcing channel frequency response (CFR) estimate at the pilot locations can be determined (501). Further, the ML CFR estimates on the pilots can be grouped (502) into disjoint clusters as depicted in the FIG. 3. A hypothesis test can be formulated (503) to check the similarities between the clusters. The hypothesis test can check (504) if all the clusters are similar. If the hypothesis test indicates that all the clusters are similar, then it can be assumed (505) that the channel is a single tap while estimating the CFR (506). However, if the hypothesis test indicates that not all the clusters are similar, then one can check (507) if some of the clusters are similar while others are not. If the hypothesis test indicates that some of the clusters are similar while some are not, then the CFR estimation can be treated as a minimax problem (508) with additional constraints on the autocorrelation matrix of the CFR, wherein the constraints reflect the extent of similarity between the clusters. In other words, $W_{prop}$ is the Wiener filter matrix which minimizes the CFR estimation mean square error (MSE) given that it corresponds to the CFR autocorrelation sequence which leads to the maximum possible mean square error in estimating the CFR over the entire RB among all possible channel autocorrelation sequences given the constraint that the autocorrelation sequence has to reflect the fact that certain clusters are similar while some are not. Since $W_{prop}$ minimizes the worst case MSE subject to certain additional constraints on the autocorrelation sequence, it is a solution to a constrained minimax problem whereas the simple minimax estimator does not impose the additional constraint that the autocorrelation sequence has to reflect the similarity between certain clusters.

The constraint on the autocorrelation sequence can be $\|r(0)-r(1)\| \leq \gamma$ where $\gamma > 0$ and the value of $\gamma$ reflects the degree of similarity between the clusters, i.e. smaller its value more is the similarity between the clusters and r(i) is the spaced frequency spaced time correlation value at the $i_{th}$ lag. Here $\|x\|$ denotes the norm of x. If the hypothesis tests indicate that all the clusters differ significantly from one another (509), then the CFR values within each cluster can be divided (510) into disjoint groups. Further, the groups within a cluster can be analyzed (511) to identify similar groups. If all the groups within a cluster are dissimilar even for one cluster (512) then the minimax approach for CFR estimation can be utilized (513). In other words, is $W_{prop}$ the Wiener filter which minimizes the MSE given that it corresponds to the autocorrelation sequence which is the worst case autocorrelation sequence, i.e. it maximizes the estimation MSE over the RB compared to all other possible autocorrelation sequences. However, if all groups within a cluster are similar and this is true for each cluster, then again determine (514) the minimax filter with the constraint on the autocorrelation matrix of the CFR reflecting the fact that the clusters are not similar but within a cluster the groups are similar. In other words, $W_{prop}$ is the Wiener filter which minimizes the CFR estimation MSE given that it corresponds to the autocorrelation sequence which is the worst case autocorrelation sequence, i.e. it maximizes the estimation MSE over the RB compared to all other possible autocorrelation sequences with the additional constraint that the autocorrelation sequence has to reflect the fact that within each cluster all the entries are similar though the clusters are not similar to each other. The constraint on the autocorrelation sequence can be $\|r(0)-r(1)\| \leq \rho$ where $\rho > 0$ and the value of $\rho$ reflects the degree of similarity between the groups in a cluster, i.e. smaller its value more is the similarity between the groups in each cluster. The various actions in the method 500 can be performed in the order presented, in a different order or simultaneously. Further, in some embodiments, some actions listed in FIG. 5 can be omitted.

In an embodiment, different levels of significance can be utilized for each of the hypothesis tests performed here. In another embodiment, all the hypothesis tests can have the same level of significance.

Both the hypothesis test in (10) and the hypothesis test in (20) are highly effective in detecting whether the CFR variation is significant compared to the noise over the region of interest.

In an embodiment, different RBs for the same channel model may see selectivity to varying extents. Further, performing hypothesis tests for each RB may lead to maximum exploitation of the time and frequency varying nature of the CFR in designing the RA-MMSE estimator.

In another embodiment, either of the aforementioned hypothesis tests or the outcome from both the tests can be utilized to decide the final RA-MMSE estimator. Since both the tests (10) and (20) use different statistics, the final interpolator can be a linear combination of the interpolator decided based on test (10) and the interpolator decided based on test (20) so as to utilize the information available from both the tests efficiently.

Here in (17), (18) and (21) the filters $W_{prop}$ are obtained by only replacing sets of values in $W_{rob}$ by a set of average values with each average value calculated using a subset of entries in $W_{rob}$.

In an embodiment, weighted averages over the same subsets can be performed to decide the final RA-MMSE estimator. For example, instead of (17) the following $W_{prop}$ given by $$W_{prop} = \sum_{i=1}^{3} W_{rob} \tilde{S}_{S_i} \tilde{E}_{S_i}^T \quad (23)$$

can be used. Here $\tilde{S}_{S_i}$ is a P×M matrix where M is the cardinality of set $S_i$ and each column of $\tilde{S}_{S_i}$ have non-zero values only at the locations given by $S_i$. For example, $\tilde{S}_{S_i}$ is a P×4 matrix since $S_1=\{1,2,7,8\}$ and each column of $\tilde{S}_{S_i}$ has non zero entries at the $1^{st}$, $2^{nd}$, $7^{th}$ and $8^{th}$ locations only with the remaining entries in each column being zero. Here $\tilde{E}_{S_i}$ is a M×P matrix with each row having only one non zero element with all the non-zero elements having value one. The location of the non-zero element in the $j^{th}$ row is equal to the value of the $j^{th}$ element in the set $S_i$. If all the non-zero entries in $\tilde{S}_{S_i}$ is equal to 0.25 then (23) can be equivalent to (17). Each non-zero element in $\tilde{S}_{S_i}$ can be a value between zero and one and by varying the values of these non-zero element a weighted average can be performed instead of the simple averaging operation in (17). In an embodiment, weighted averaging operations can be defined for (18) and (21) by using aforementioned approach.

The final CFR estimate over the RB is given by $$\hat{H}_{RA\text{-}MMSE} = W_{prop} Y_p \quad (24)$$

where $W_{prop}$ is the proposed interpolator based on the outcome of the hypothesis tests ($W_{prop}$ is a smoothed version of the robust 2D MMSE filter or it is the minimax filter with additional constraints which reflect the degree of similarity between the clusters). The interpolator can be designed by assuming that the input to the interpolator is $Y_p$. Further, equivalent form of the interpolator can also be designed with the input being the CFR estimate at the pilot location. When the CFR estimate at the pilot location is the ML CFR estimate then the output of the interpolator can be the same as the output in (24).

In an embodiment, CFR estimates in the RB can be obtained by applying the equivalent form of the interpolator onto improved CFR estimates at the pilot location wherein by 'improved' CFR estimates means CFR estimates which are better than the simple ML estimates at the pilot locations.

In an embodiment, CFR estimates in the RB can be obtained by solving an optimization problem with additional constraints wherein the additional constraints reflect the degree of similarity between the different clusters and groups and the optimization problem tries to find a MMSE or MLE or minimax estimate of the CFR different from the minimax estimator discussed here Depending on the deployed OFDM system, such as LTE-A or 802.16m, the size of the RBs, and the pilot pattern may vary. Hence, the number of clusters r and the set of possible interpolators/filter may also vary. With the increase in the number of clusters, many more filters/interpolators for the RA-MMSE method can be possible. For example, the number of hypothesis tests for testing pair-wise equality of means for r clusters would be $$\binom{r}{2}.$$

Embodiments disclosed herein significantly outperform the robust 2D-MMSE method and also is very close to the performance achieved by optimal MMSE approach. Further, the computational complexity of RA-MMSE method is comparable to (and depending on the channel model even lesser than) that of the robust 2D-MMSE method.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for channel estimation for a received signal in an orthogonal frequency division multiplexing (OFDM) network, said method comprising of:
    calculating a first channel frequency response estimate using said signal at pilot locations in said signal;
    grouping said first channel frequency estimates into a plurality of disjoint clusters;
    formulating at least one hypothesis test based on statistics which tests equality of mean between said clusters to check for similarity;
    dividing said first channel frequency estimates into said plurality of disjoint groups within each said clusters;
    checking for similarity of said groups within each of said clusters, when there is no similarity between any pair of said clusters; and
    estimating a final channel frequency response estimate, depending on level of similarity between said clusters.

2. The method, as claimed in claim 1, wherein said first channel frequency response estimate is estimated using at least one of:
    maximum likelihood estimation; and
    zero forcing channel estimation.

3. The method, as claimed in claim 1, wherein said at least one hypothesis test checks for pairwise similarity between said clusters.

4. The method, as claimed in claim 1, wherein said at least one hypothesis test is done to determine frequency and/or time selectivity of said channel over a resource block (RB) based on the amplitude of the difference in the mean values of the first channel frequency estimates in different clusters.

5. The method, as claimed in claim 1, wherein said at least one hypothesis test is done to determine frequency and/or time selectivity of said channel over a resource block (RB) based on the angle between the mean values of the first channel frequency estimates in different clusters.

6. The method, as claimed in claim 1, wherein said final channel frequency response estimate is estimated by assuming that channel of said signal is single tap, when all of said clusters are similar or at least r−1 of a total of r clusters are similar.

7. The method, as claimed in claim 1, wherein said final channel frequency response estimate is estimated using a first smoothed version of a robust minimum mean square error (MMSE) filter matrix, when at least one pair of said clusters are similar, but all said clusters are not similar.

8. The method, as claimed in claim 1, wherein said final channel frequency response estimate is estimated as a first minimax problem with a first set of constraints on autocorrelation matrix of said channel frequency response, when at least one of said pair of clusters are similar, but all of said clusters are not similar.

9. The method, as claimed in claim 1, wherein a minimax estimation approach is used for estimating said final channel frequency response, when said groups within at least one of said clusters are not similar.

10. The method, as claimed in claim 7, wherein said first smoothed version is a function of extent of similarity of said clusters.

11. The method, as claimed in claim 7, wherein said robust MMSE filter matrix is used for estimating said final channel frequency response, when said groups within at least one of said clusters are not similar.

12. The method, as claimed in claim 7, wherein said final channel frequency response estimate is estimated using a second smoothed version of said robust MMSE filter matrix, when all of said groups within said cluster are similar for every said cluster.

13. The method, as claimed in claim 8, wherein said first set of constraints are a function of extent of similarity of said clusters.

14. The method, as claimed in claim 8, wherein said final channel frequency response estimate is estimated as a second minimax problem with a second set of constraints on autocorrelation matrix of said channel frequency response, when all of said groups within a said cluster are similar for every said cluster.

15. The method, as claimed in claim 12, wherein said second smoothed version is a function of the extent of similarity of groups within all of said clusters.

16. The method, as claimed in claim 14, wherein said second set of constraints are a function of the extent of similarity of groups within all of said clusters.

17. An orthogonal frequency division multiplexing (OFDM) network, said network comprising of at least one means configured for:
    calculating a first channel frequency response estimate using a received signal at pilot locations in said signal;
    grouping said first channel frequency estimates into a plurality of disjoint clusters;
    formulating at least one hypothesis test based on statistics which tests equality of mean between said clusters to check for similarity;
    dividing said first channel frequency estimates into said plurality of disjoint groups within each said clusters;
    checking for similarity of said groups within each of said clusters, when there is no similarity between any pair of said clusters; and
    estimating a final channel frequency response estimate, depending on level of similarity between said clusters.

18. The network, as claimed in claim 17, wherein said network is configured for estimating first channel frequency response estimate using at least one of:
    maximum likelihood estimation; and
    zero forcing channel estimation.

19. The network, as claimed in claim 17, wherein said network is configured for using said at least one hypothesis test to check for pairwise similarity between said clusters.

20. The network, as claimed in claim 17, wherein said network is configured for estimating said final channel frequency response estimate by assuming that channel of said signal is single tap, when all of said clusters are similar or at least r−1 of a total of r clusters are similar.

21. The network, as claimed in claim 17, wherein said network is configured for estimating said final channel frequency response estimate using a first smoothed version of a robust minimum mean square error (MMSE) filter matrix, when at least one pair of said clusters are similar, but all said clusters are not similar.

22. The network, as claimed in claim 17, wherein said network is configured for estimating said final channel frequency response estimate as a first minimax problem with a first set of constraints on autocorrelation matrix of said channel frequency response, when at least one of said pair of dusters are similar, but all of said clusters are not similar.

23. The network, as claimed in claim 17, wherein said network is configured for estimating said final channel frequency response using a minimax estimation approach, when said groups within at least one of said clusters are not similar.

24. The network, as claimed in claim 21, wherein said network is configured for estimating said final channel frequency response using said robust MMSE filter matrix, when said groups within at least one of said clusters are not similar.

25. The network, as claimed in claim 21, wherein said network is configured for estimating said final channel frequency response using a second smoothed version of said robust MMSE filter matrix, when all of said groups within said cluster are similar for every said cluster.

26. The network, as claimed in claim 22, wherein said network is configured for estimating said final channel frequency response as a second minimax problem with a second set of constraints on autocorrelation matrix of said channel frequency response, when all of said groups within said cluster are similar for every said cluster.

27. A device in an orthogonal frequency division multiplexing (OFDM) network, said device comprising of at least one means configured for:
   calculating a first channel frequency response estimate using a received signal at pilot locations in said signal;
   grouping said first channel frequency estimates into a plurality of disjoint clusters;
   formulating at least one hypothesis test based on statistics which tests equality of mean between said clusters to check for similarity;
   dividing said first channel frequency estimates into said plurality of disjoint groups within each said clusters;
   checking for similarity of said groups within each of said clusters, when there is no similarity between any pair of said clusters; and
   estimating a final channel frequency response estimate, depending on level of similarity between said clusters.

28. The device, as claimed in claim 27, wherein said device is configured for estimating first channel frequency response estimate using at least one of:
   maximum likelihood estimation; and
   zero forcing channel estimation.

29. The device, as claimed in claim 27, wherein said device is configured for using said at least one hypothesis test to check for pairwise similarity between said clusters.

30. The device, as claimed in claim 27, wherein said device is configured for estimating said final channel frequency response estimate by assuming that channel of said signal is single tap, when all of said clusters are similar or at least r−1 of a total of r clusters are similar.

31. The device, as claimed in claim 27, wherein said device is configured for estimating said final channel frequency response estimate using a first smoothed version of a robust minimum mean square error (MMSE) filter matrix, when at least one pair of said clusters are similar, but all said clusters are not similar.

32. The device, as claimed in claim 27, wherein said device is configured for estimating said final channel frequency response estimate as a first minimax problem with a first set of constraints on autocorrelation matrix of said channel frequency response, when at least one of said pair of clusters are similar, but all of said clusters are not similar.

33. The device, as claimed in claim 27, wherein said device is configured for estimating said final channel frequency response using a minimax estimation approach, when said groups within at least one of said clusters are not similar.

34. The device, as claimed in claim 31, wherein said device is configured for estimating said final channel frequency response using said robust MMSE filter matrix, when said groups within at least one of said clusters are not similar.

35. The device, as claimed in claim 31, wherein said device is configured for estimating said final channel frequency response using a second smoothed version of said robust MMSE filter matrix, when all of said groups within said cluster are similar for every said cluster.

36. The device, as claimed in claim 32, wherein said device is configured for estimating said final channel frequency response as a second minimax problem with a second set of constraints on autocorrelation matrix of said channel frequency response, when all of said groups within a said cluster are similar for every said cluster.

* * * * *